(12) United States Patent
Chigapov et al.

(10) Patent No.: US 7,678,734 B2
(45) Date of Patent: Mar. 16, 2010

(54) OXIDATION CATALYSTS

(75) Inventors: Albert N. Chigapov, Aachen (DE); Brendan Patrick Carberry, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/044,578

(22) Filed: Mar. 7, 2008

(65) Prior Publication Data

US 2008/0227629 A1    Sep. 18, 2008

(30) Foreign Application Priority Data

Mar. 14, 2007    (EP) ................... 07104147

(51) Int. Cl.
*B01J 23/10* (2006.01)
*B05D 3/02* (2006.01)

(52) U.S. Cl. ...................... 502/304; 427/229
(58) Field of Classification Search ................ 502/304; 427/229
See application file for complete search history.

(56) References Cited

U.S. PATENT DOCUMENTS

| | | | |
|---|---|---|---|
| 3,905,918 A | 9/1975 | Mai et al. | |
| 4,857,499 A * | 8/1989 | Ito et al. | 502/326 |
| 5,010,051 A * | 4/1991 | Rudy | 502/304 |
| 5,128,306 A * | 7/1992 | Dettling et al. | 502/304 |
| 5,643,543 A * | 7/1997 | Guibard et al. | 423/213.5 |
| 6,365,118 B1 | 4/2002 | Kharas et al. | |

FOREIGN PATENT DOCUMENTS

| | | |
|---|---|---|
| EP | 0747581 | 4/2002 |
| JP | 2004353619 | 12/2004 |
| JP | 2005-009407 | 1/2005 |
| JP | 2005023921 | 1/2005 |
| JP | 2005-002968 | 6/2005 |
| JP | 2005248787 | 9/2005 |
| KR | 20020061324 | 7/2002 |
| WO | WO 96/39576 | 12/1996 |
| WO | WO 02/058819 | 8/2002 |

OTHER PUBLICATIONS

Bimetallic Pt/Pd diesel oxidation catalysts Structural characterisation and catalytic behaviour A. Morlang, U. Neuhausen, K.V. Klementiev, F.-W. Schütze, G. Miehe, H. Fuess, E.S. Lox, Applied Catalysis : B Environmental 60 (2005) pp. 191-199, no month.

* cited by examiner

*Primary Examiner*—Elizabeth D Wood
(74) *Attorney, Agent, or Firm*—Damian Porcari; Brooks Kushman P.C.

(57) ABSTRACT

The present invention relates to an oxidation catalyst comprising a substrate and an oxidation coating of platinum (Pt), palladium (Pd), cobalt (Co), iron (Fe) and cerium (Ce) applied to the substrate. Furthermore the invention relates to a method for producing such an oxidation catalyst and an internal combustion engine using such an oxidation catalyst.

18 Claims, 10 Drawing Sheets

| Catalyst | T / °C | $C_3H_6$ conversion / % |
|---|---|---|
| Pt/Al$_2$O$_3$ (C1.1) | 145 | 90 |
| Pt-Pd/Al$_2$O$_3$ (C2.2) | 145 | 100 |
| Pt-Pd-Fe/Al$_2$O$_3$ (C 3.2.1) | 149 | 80 |
| Pt-Pd-Co /Al$_2$O$_3$ (C 3.2.2) | 127 | 100 |
| Pt-Pd-Co-Fe-Ce/Al$_2$O$_3$ (C4) | 119 | 100 |

Figure 5

| T/°C | Pt-Pd-Co-Fe-Ce/Al₂O₃ (C4) | | | Pt-Pd/Al₂O₃ (C2) | | |
|---|---|---|---|---|---|---|
| | NO₂ out/ ppm | NOₓ out/ ppm | NO₂/NOₓ % | NO₂ out/ ppm | NOₓ out/ ppm | NO₂/NOₓ % |
| 150 | 0 | 265 | 0 | | | |
| 175 | 5 | 255 | 2 | 7 | 265 | 3 |
| 200 | 12 | 173 | 7 | 56 | 145 | 39 |
| 225 | 35 | 220 | 16 | 92 | 164 | 56 |
| 250 | 62 | 232 | 27 | 113 | 192 | 59 |
| 275 | 105 | 240 | 44 | 137 | 217 | 63 |
| 300 | 100 | 255 | 39 | 165 | 240 | 69 |
| 325 | 100 | 265 | 38 | 180 | 258 | 70 |
| | | | | 185 | 270 | 69 |

Figure 8

OXIDATION CATALYSTS

CROSS-REFERENCE TO RELATED APPLICATION

This application claims priority to European Application No. 07104147.9 filed Mar. 14, 2007.

BACKGROUND OF THE INVENTION

The present invention relates to an oxidation catalyst comprising a substrate and an oxidation coating of platinum (Pt), palladium (Pd), cobalt (Co), iron (Fe) and cerium (Ce) applied to the substrate. Furthermore, the invention relates to a method for producing such an oxidation catalyst and receiving exhaust gas from internal combustion engine.

For automotive applications, an oxidation catalyst is arranged normally within the exhaust gas system for oxidizing unburned hydrocarbons and carbon monoxide (CO) present in the exhaust gas. A conventional oxidation catalyst comprises a substrate containing aluminum oxide ($AL_2O_3$), e.g., an alumina washcoated cordierite substrate and a coating which comprises platinum (Pt). Such an oxidation catalyst is referred to an a Pt/alumina-catalyst or Pt catalyst.

If a particulate filter is already disposed in the exhaust pipe, the oxidation catalyst is normally placed upstream of the filter and is used to increase the exhaust gas temperature for the purpose of filter regeneration. Because a conventional Pt/alumina-catalyst has little significant catalytic activity at temperatures below 100° C., low-temperature catalysts were developed with an improved conversion rate at temperatures below 100° C. representing cold-start conditions of internal combustion engines. To improve the conversion rates below temperatures of 100° C., platinum-palladium coating on aluminum substrate were introduced. Such an oxidation catalyst can be named a Pt—Pd/alumina-catalyst or Pt—Pd catalyst.

A mixed Pt—Pd/alumina-catalyst for CO oxidation under cold-start conditions is described in the WO 96/39576. The disclosed catalyst is able to oxidize CO at near room temperature, but only if using zeolite as a water trap and a hydrocarbon trap to avoid catalyst poisoning by water and hydrocarbons. This catalyst is also vulnerable to sulfur compounds reacting with the palladium addition and is designed primarily for gasoline vehicles using low sulfur fuels. Similar Pt—Pd catalysts are also described in the U.S. Pat. No. 5,128,306 and JP 2005248787. Another advantage of such a bimetallic Pt—Pd/alumina-catalyst in comparison to conventional monometallic Pt/alumina catalyst is its higher thermal stability. Exhaust catalyst components can reach a temperature 650° C. during filter regeneration of a particulate filter. Furthermore, bimetallic Pt—Pd/alumina catalyst is also less expensive due to lower cost of palladium as compared to platinum. Yet another advantage of bimetallic catalysts is its tolerance to poisoning by CO adsorption at low temperatures as compared to monometallic Pt standard catalyst. Low temperature operation results in higher concentrations of CO.

The properties and advantages of such mixed Pt—Pd oxidation catalysts were, e. g., published in "Bimetallic Pt/Pd diesel oxidation catalysts" (Morlang, A.; Neuhausen, U.; Klementiev, K. V.; Schuetze, F.-W.; Miehe, G.; Fuess, H.; Lox, E. S.; Institute for Materials Science, Darmstadt University of Technology, Petersenstr. 23, Darmstadt, Germany. Applied Catalysis, B: Environmental (2005), 60(3-4), 191-199. Publisher: Elsevier B. V). One disadvantage of such oxidation catalysts is that typically the amount of $NO_2$ is significantly higher after the exhaust gases have passed such a catalyst because that oxidation catalyst is able to oxidize the NO present within the exhaust gases to $NO_2$. This effect is much more obvious with diesel engines than with gasoline engines because of the lean engine operation mode of diesel engines, i.e., the excess of oxygen. Unfortunately, Pt—Pd catalysts also increase $NO_2$ emissions as compared with Pt catalysts. Increased $NO_2$ emissions are an impediment widespread use of oxidation catalysts.

Technologies such as Selective Catalytic Reduction (SCR) using ammonia or urea and Lean $NO_x$ Traps (LNTs) are designed for the reduction of both NO and $NO_2$ and not specifically targeting $NO_2$. For example, JP 2005023921 discloses an exhaust emission control device to reduce $NO_2$ by having an oxidation catalyst arranged at the front stage of an SCR catalyst. A bypass flow path is provided whereby exhaust gas is guided to the SCR catalyst while bypassing the oxidation catalyst. When excessive $NO_2$ is produced by the oxidation catalyst, part of the exhaust gas is guided via the bypass flow path to the SCR catalyst thus bypassing the oxidation catalyst. This reduces the amount of the $NO_2$ produced by the oxidation catalyst. JP 2005002968 shows a similar design.

JP 2005009407 shows a different approach. A fuel-supply valve, a catalyst, and a particulate filter are provided in this order in the path of an engine exhaust gas. The upstream end of the catalyst has a high Pt loading and oxidation activity. The downstream end of the catalyst has a high Pd loading in order to reductively eliminate $NO_2$ formed by the platinum.

JP 2004353619 discloses a method to reduce $NO_x$ to $N_2$. The system is equipped with a discharge device installed in an exhaust pipe in which exhaust gas is discharged and making ozone ($O_3$) by a plasma discharge in oxygen ($O_2$) and nitrogen monoxide (NO) contained in exhaust gas to react and generate nitrogen dioxide ($NO_2$). A nitrogen dioxide ($NO_2$) reduction catalyst is installed in a later part of the discharge device in the exhaust pipe and is reducing nitrogen dioxide ($NO_2$) to nitrogen ($N_2$). The disadvantage of active $NO_2$ suppression is that these methods require reductant, active strategy and/or additional devices.

SUMMARY OF THE INVENTION

The current invention provides an oxidation catalyst with low $NO_2$ emissions as compared to conventional Pt or Pt—Pd/alumina catalysts without using expensive additional $NO_2$ suppression systems, while keeping the same or showing even higher activity in CO oxidation and hydrocarbon oxidation the same or higher thermal stability. The catalyst may be prepared in the form of a coating covering a substrate, wherein the coating comprises platinum (Pt) and palladium (Pd) and active oxide components of cobalt (Co), iron (Fe) and cerium (Ce). The addition of those three oxides increases the activity of a conventional Pt—Pd/alumina catalyst in CO and hydrocarbon oxidation even under lean engine operating conditions, i.e. in excess of oxygen. The resulting catalyst Pt—Pd—Co—Fe—Ce/alumina is highly active in CO oxidation at near room temperature (cold start) and high space velocities. Hydrocarbon oxidation activity is also improved. The catalyst is more thermally stable than conventional Pt—Pd/alumina catalysts after aging at 650° C. in reaction mixture. The addition of cobalt oxide, iron oxide and cerium oxide together strongly suppresses $NO_2$ formation and produces low $NO_2$ emissions.

An embodiment of the catalyst includes a total content of Pt and Pd less than 10 wt %, preferably less than 5 wt % relative to the total coating. The Pt/Pd molar ratio is about 1:1. The coating's total content of the active oxide component of cobalt (Co) ranges between 1 wt % and 3 wt % relating to the total coating, preferably between 1.5 wt % and 2.5 wt % relating to the total coating.

An embodiment of the catalyst includes a total content of the active oxide component of iron (Fe) ranging between 1 wt % and 12 wt % relating to the total coating, preferably between 4 wt % and 9 wt % relating to the total coating. The catalyst includes an active oxide component of cerium (Ce) ranging between 2 wt % and 6.5 wt % relating to the total coating, preferably between 3.5 wt % and 5 wt % relating to the total coating.

The invention further includes a method for producing an oxidation catalyst according to any of the above described embodiments, which comprises covering the selected substrate, typically cordierite which was washcoated preliminary with alumina, with a catalytic coating containing platinum (Pt), palladium (Pd) and active oxide components of cobalt (Co), iron (Fe) and cerium (Ce).

The method of producing an oxidation catalyst comprises following steps:
- preparing a solution containing platinum (Pt) tetra ammine salts, palladium (Pd) tetra ammine nitrate, nitrates of iron (Fe), cerium (Ce) and cobalt (Co), and tartaric acid;
- impregnating a support structure with this solution;
- slowing drying the impregnated support structure; and
- calcinating the impregnated support structure.

Platinum (Pt) tetra ammine salts will act as platinum precursors whereby those salts are preferably nitrates or hydroxide compounds. Palladium (Pd) tetra ammine nitrate will act as a precursor for palladium. The used support structure could be e.g. an alumina support with high surface area, e.g., 212 $m^2/g$ or an alumina washcoated cordierite substrate. Other support oxides may be used instead of an alumina support as well. For example, zirconium or Cerium-zirconium, e.g., with a molar ratio of 3 to 1 could be used.

The method of preparing said catalyst coating by using tartaric acid as a complexing agent results in obtaining high activity in oxidation of carbon monoxide and hydrocarbons and improves the activity of Pt and Pt—Pd/catalysts on alumina in comparison with standard commercial catalysts. The tartaric acid is preferably added in excess necessary relative to metallic and metallic oxide precursor components.

Preferably, a factor of 1.2 to 20 of the necessary amount of tartaric acid is used. In addition, tartaric acid will act as a complexing agent and soft reductant of precious metal precursors. The use of citric acid instead of tartaric acid leads to similar, but lower results, while an activity of catalysts prepared without hydroxy-carboxylic acids is significantly lower. The use of platinum tetra ammine hydroxide and tartaric acid together requires first very slow, drop wise addition of the hydroxide to the solution of tartaric acid under low temperature conditions to avoid violent reaction between both components with formation of platinum-containing deposit. There is no such problem with tetra ammine platinum nitrate.

The catalyst produced is suitable for reducing unburned hydrocarbons and carbon monoxide (CO) emissions of an internal combustion engine. The catalyst may be used as an automotive after treatment device for reducing exhaust gas emissions, especially for carbon dioxide (CO), hydrocarbons and is designed for high activity in CO, hydrocarbon reduction and nitrogen dioxide ($NO_2$) reduction from both gasoline and diesel engines. The catalyst may also be applied to stationary engines and low-temperature CO elimination, for example respiratory protection systems, closed parking areas and garage areas.

BRIEF DESCRIPTION OF THE DRAWINGS

The invention and conversion rates for typical test conditions are illustrated in the following figures.

FIG. 5 shows the propane oxidation activity for different types of catalysts.

FIG. 8 shows the NO oxidation capability of (C4) catalyst compared to the reference (C2) catalyst.

DETAILED DESCRIPTION OF THE PREFERRED EMBODIMENTS

Figure 1:
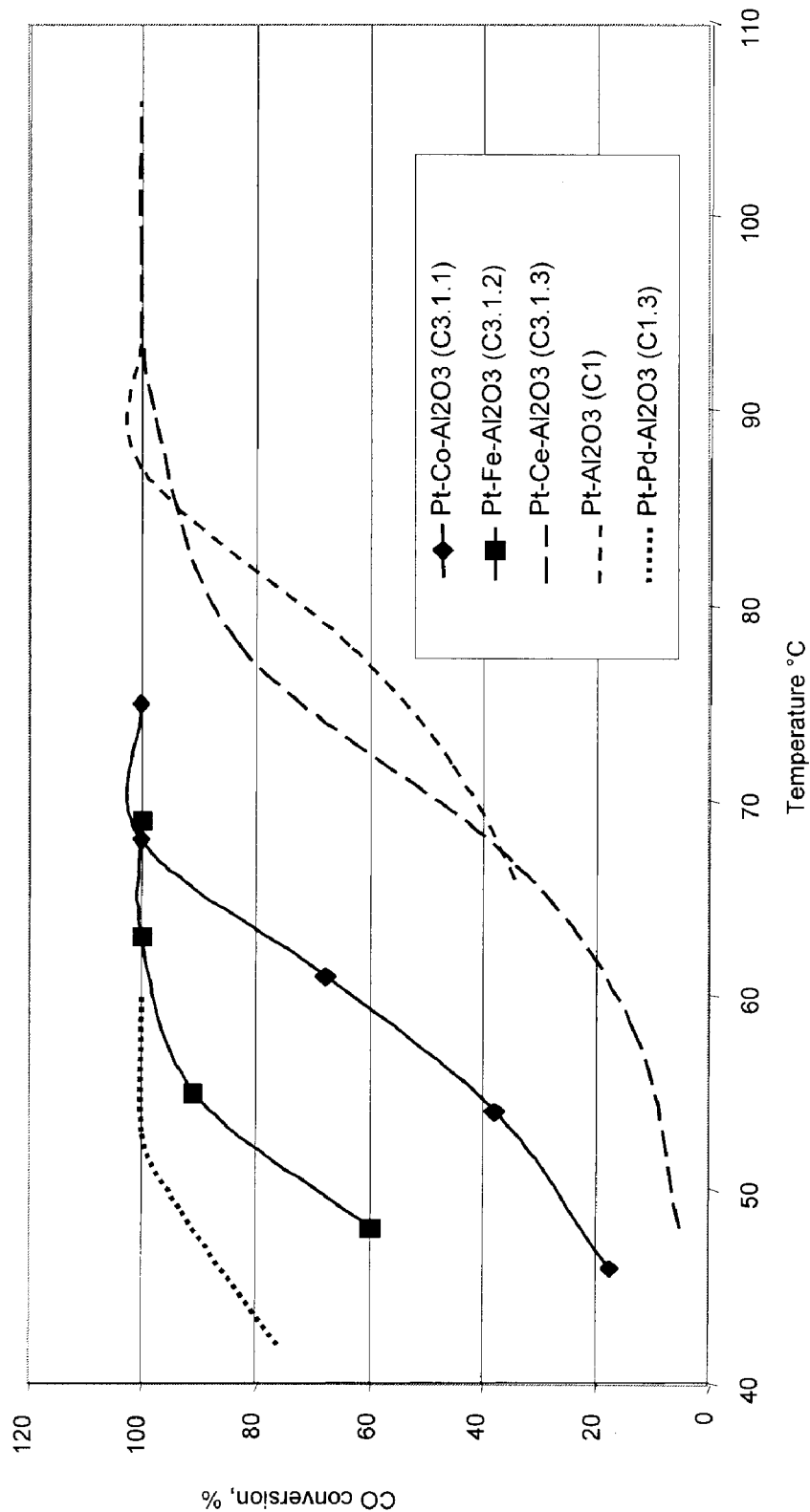
FIG. 1 shows a diagram representing the effect of the addition of Pd, Co, Fe and Ce on activity of Pt/alumina catalysts in CO oxidation.

For the investigations described below, an alumina-washcoated cordierite having 400 cpsi and an alumina loading of 38 weight-percent (wt %) was used as a support. All catalysts were tested in a laboratory-scale packed-bed flow reactor made from a 1 cm ID×5 cm L quartz tube. An electric furnace was used for heating the reactor. The temperature was monitored by a thermocouple placed in the center of the catalyst bed. A powdered catalyst sample with catalyst loading of 10-200 mg depending on catalyst density was diluted with 1 $cm^3$ of quartz sand, then inserted into the reactor and exposed to the feed gas mixtures.

The reaction mixture of 10 volume-percent (vol %) $O_2$, 0.13 vol % CO, 250 ppm $C_3H_6$, 50 ppm $C_3H_8$, 5.2 vol % $H_2O$, 4.9 vol % $CO_2$, 210 ppm NO with $N_2$ as a balance was used to simulate typical diesel exhaust gas composition. A conventional flow setup was used for gas mixture preparation. All gases were of ultra high purity. A humidifier was installed to provide precise water concentration in the gas line. The flow rates were controlled using mass flow controllers (MKS, Munich, Germany). To prevent water condensation, all connection lines were installed in a thermal box maintaining constant temperature of 85° C. Reactor effluents were analyzed with a HP 6890A gas chromatograph, using Porapak Q and NaX capillary columns. Chemiluminescence $NO/NO_x$ analyzer (Eco-physics company) CLD-700 E1 ht was used for continuous NO and $NO_2$ measurement.

Before testing, all fresh catalysts were reduced in the hydrogen flow at 160° C. for 20 minutes with following cooling. Aging was carried out in reaction mixture at 550° C. for three hours and 650° C. for one hour. BET surface areas were measured by $N_2$ adsorption at 77K using Micromeritics 2010 ASAP instrument. XRD study was carried out using DRON 4 diffract meter with Cu Kα radiation.

The following types of catalysts were used for testing using different types of preparation and different precious metal loadings:

Type C1.1 is a conventional Pt/alumina-catalyst with 140 grams of Pt per cubic foot (140 $g/ft^3$, called standard A).

C1.2 is a conventional Pt/alumina-catalyst (90 $g/ft^3$, called standard B).

C1.3 is a Pt—Pd catalyst (120 $g/ft^3$ Pt and 120 $g/ft^3$Pd).

Those three types of catalysts may be applied for diesel after treatment and are available as a standard commercial catalyst. The calcination temperature in preparing those samples was the same temperature as for the samples C4 below.

Catalysts C2.1 and C2.2 were used as reference samples. C2.1 is a Pt/alumina and C2.2 a Pt—Pd/alumina catalyst. The difference from C1.1 to C1.3 is that C2.1 and 2.2 were prepared with tartaric acid.

Catalyst C2.1 was prepared using 1.5 g of tetra ammine platinum (II) nitrate (Pt 49.9 wt %) and 6.0 g of L-(+)-tartaric acid dissolved in 10 g of distilled water. Afterwards, 7.5 g of finely grinded alumina were impregnated with thus prepared hot solution (80° C.) under stirring and dried at 77° C. for sixteen hours. The dried catalyst precursor was finally calcined at 500° C. for one hour. Pt loading was 9 wt %.

Catalyst C2.2 was prepared by using 1.2 g of tetra ammine platinum (II) nitrate (Pt 49.9 wt %), 0.855 g of tetra amine palladium (II) nitrate (Pd 35.1 wt %) and 6.0 g of L-(+)-tartaric acid dissolved in 10 g of distilled water. Afterwards 7.5 g of finely grinded alumina were impregnated with thus prepared hot solution (80° C.) under stirring and dried at 77° C. for sixteen hours. The dried catalyst precursor was finally calcined at 500° C. for two hours. Total Pt+Pd loading was 9 wt %.

An alumina washcoated cordierite monolith was also used as a substrate (core sample 1"×1.5") and impregnated with solution containing catalytic precursors as described above, but Pt loading was selected as 90 g/ft$^3$.

The catalysts of type C3 are comparative samples, which were prepared using the same conditions and chemicals as described for catalyst of type C1 and C2, but with addition of iron nitrate C3.1.1 (Pt—Fe/$Al_2O_3$), C3.2.1 (Pt—Pd—Fe/$Al_2O_3$), cobalt nitrate C3.1.2 (Pt—Co/$Al_2O_3$), C3.2.2 (Pt—Pd—Co/$Al_2O_3$) or cerium (III) nitrate C3.1.3 (Pt—Ce/$Al_2O_3$), C3.2.3 (Pt—Pd—Ce/$Al_2O_3$) or containing together Fe—Co (C3.1.10 or C3.2.10); Fe—Ce (C3.1.11 or C3.2.11) or Co—Ce (C3.1.12 or C3.2.12) nitrates. The amount of base metal oxides varied between 0.5 g and 6.5 g.

Type 4 catalysts (C4) Pt—Pd—Fe—Co—Ce/oxides catalysts were prepared conducting the following steps:

Firstly 1.2 g of tetra ammine platinum (II) nitrate, 0.855 g of tetra amine palladium (II) nitrate and 6.0 g of L-(+)-tartaric acid were dissolved in 10 g of distilled water. The determined amount of iron (II) nitrate (from 0.4 g to 6.4 g, preferably 1.2-4.0 g), cobalt (II) nitrate (from 0.5 g to 1.1 g, preferably 0.5-0.87 g) and cerium (III) nitrate (from 0.55 to 1.5 g, preferably 0.8-1.0 g) were added under stirring with the following heating to 80° C. on stirrer.

Subsequently, 7.5 g of finely grinded alumina were impregnated with thus prepared hot solution (80° C.) under stirring and dried at 77° C. for sixteen hours.

FIG. 1 shows the catalytic activity in CO oxidation using fresh catalyst samples. The reaction mixture included 10% $O_2$, 0.13 vol % CO, 250 ppm $C_3H_6$, 50 ppm $C_3H_8$, 5.2 vol.-% $H_2O$, 4.9 vol.-% $CO_2$, 210 ppm NO with $N_2$ as a balance and a space velocity of 100 000 h−1. The results shown that the three tested oxides, iron (Fe), cobalt (Co) and ceria (Ce) improve the catalytic activity over the standard Pt—$Al_2O_3$ catalysts in CO oxidation and simultaneously produce lower $NO_2$ emissions.

Figure 6:
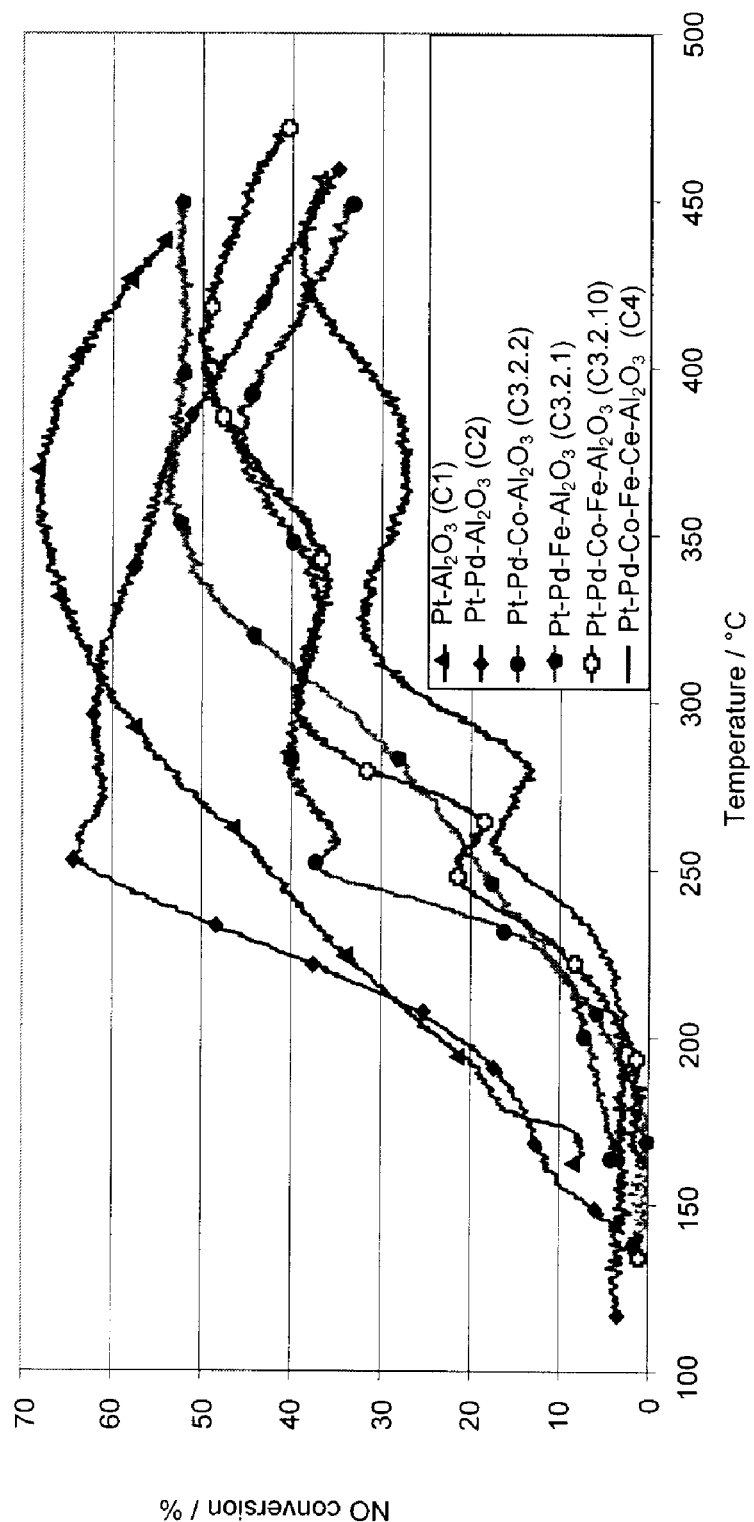
FIG. 6 shows the NO conversion to NO2 on (C4) catalyst in comparison to the standard (C1) catalyst, the reference (C2) catalyst and comparative (C3) catalysts using fresh catalysts.

The addition of palladium to Pt—Pd—$Al_2O_3$ (C2) catalyst has shown outstanding performance and higher activity in CO oxidation far exceeding the activity of standard Pt catalyst and was more active than Pt with an addition of oxides of Fe, Co or Ce. $NO_2$ emissions from this (C2) catalyst were higher than for standard Pt only catalyst as can be seen in FIGS. 5 and 6.

Figure 2:
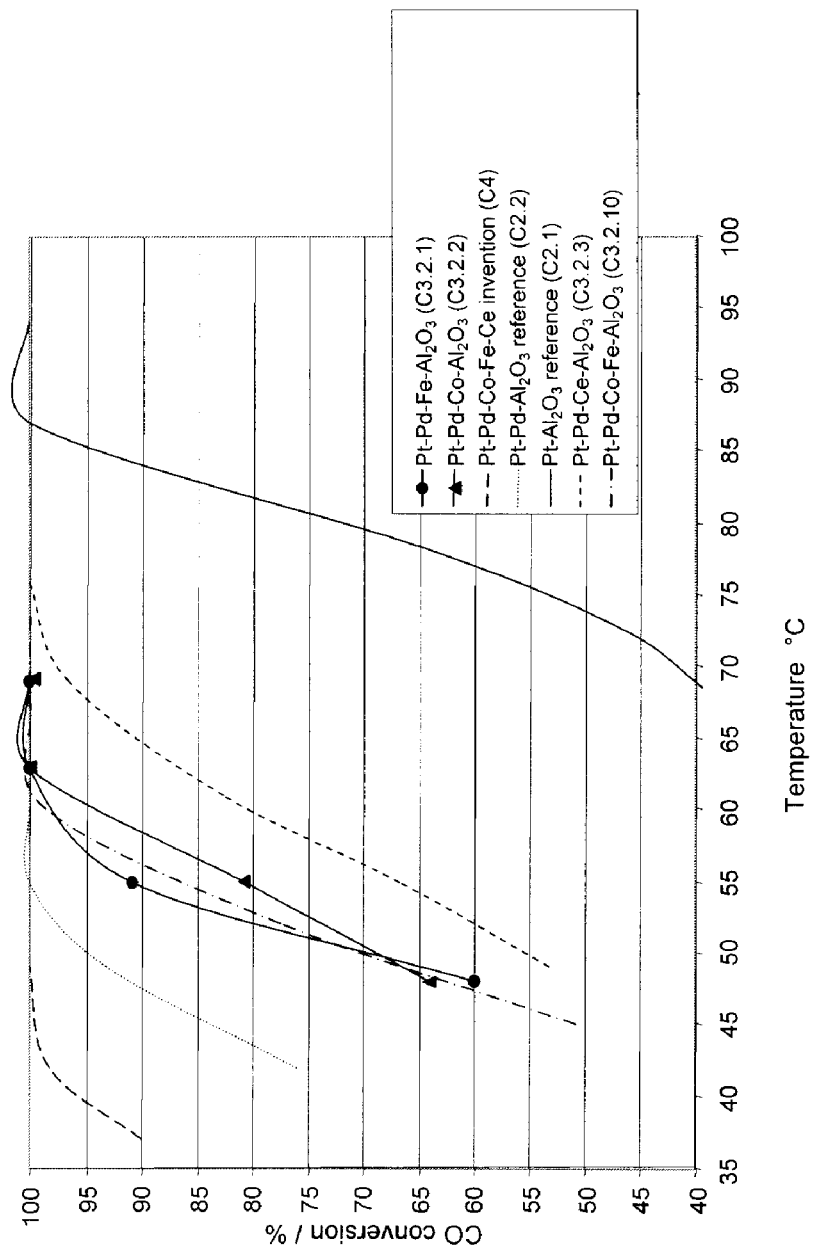
FIG. 2 shows the activity of different catalysts in CO oxidation using fresh catalysts.

FIG. 2 shows the activity in CO oxidation of the claimed and comparative catalysts. The reaction mixture is the same as for FIG. 1. The use of ternary Co—Fe—Ce addition to (C2) Pt—Pd (C4) catalyst leads to significantly higher activity than for any single oxide or binary oxide combination. Moreover, the activity in CO oxidation is higher than for (C2) Pt—Pd/Al2O3-catalyst. The C4 type catalyst is already quite active at near room temperature. Therefore, this type of catalyst is particularly effective at reducing cold-start emissions.

Figure 3:
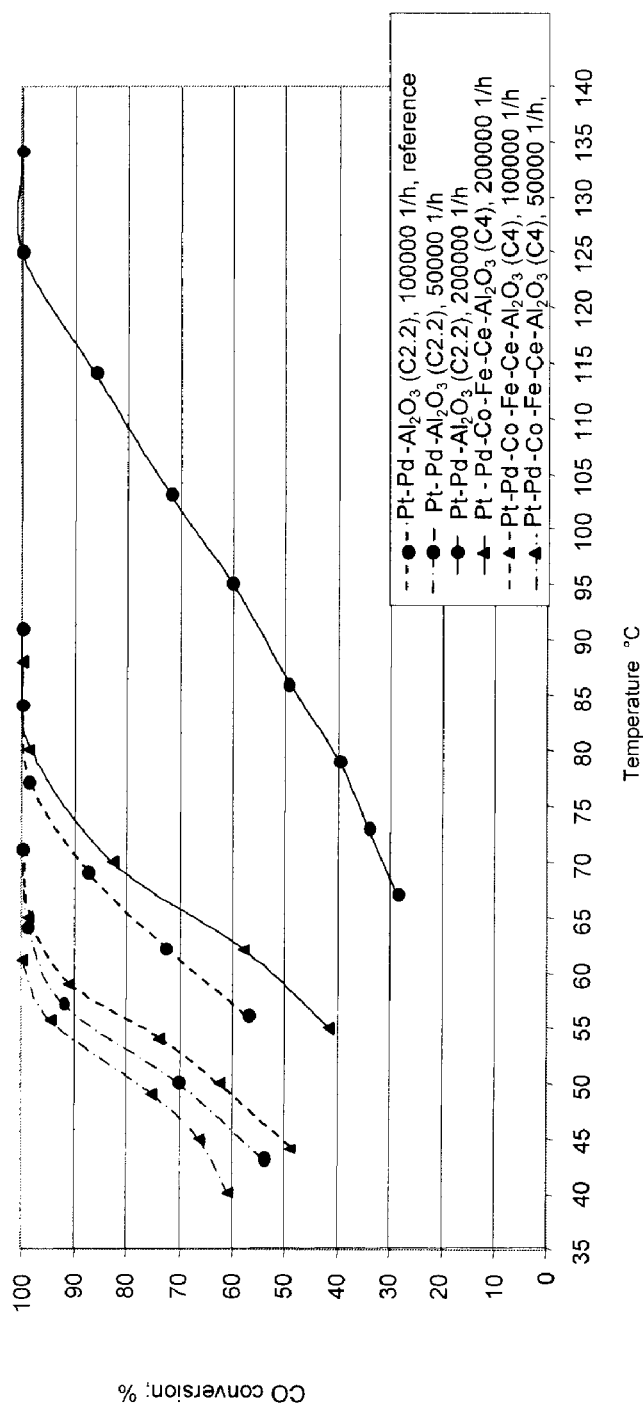
FIG. 3 shows the activity of the (C4) catalyst in CO oxidation in comparison to the reference (C2) catalyst.

FIG. 3 shows the activity of catalysts (C4) in comparison to (C2) catalyst in CO oxidation after thermal aging at 550° C. for three hours and using the above defined reaction mixture. Space velocity (SV) was varied between 50 000 h−1 and 200 000 h−1. The reaction mixture was the same as before.

The activity of Pt—Pd—Co—Fe—Ce/alumina-(C4) catalyst and Pt—Pd/alumina (C2) catalyst in CO oxidation only slightly decreased after such aging. The (C4) catalyst was more active at space velocities range from 50 000 up to 200 000 h−1, with the differences in activity becoming bigger at higher SV numbers. As an example, the complete CO oxidation is reached at close to 80° C. on Pt—Pd—Co—Fe—Ce/$Al_2O_3$-(C4) catalyst and only at about 125° C. on Pt—Pd/$Al_2O_3$-catalyst (C1.3) at a SV=200 000 h−1. Both C4 and the catalyst were more active than standard commercial Pt—Pd/alumina (C1) catalyst, even if the C1 catalyst were having higher noble metal loadings.

Figure 4:
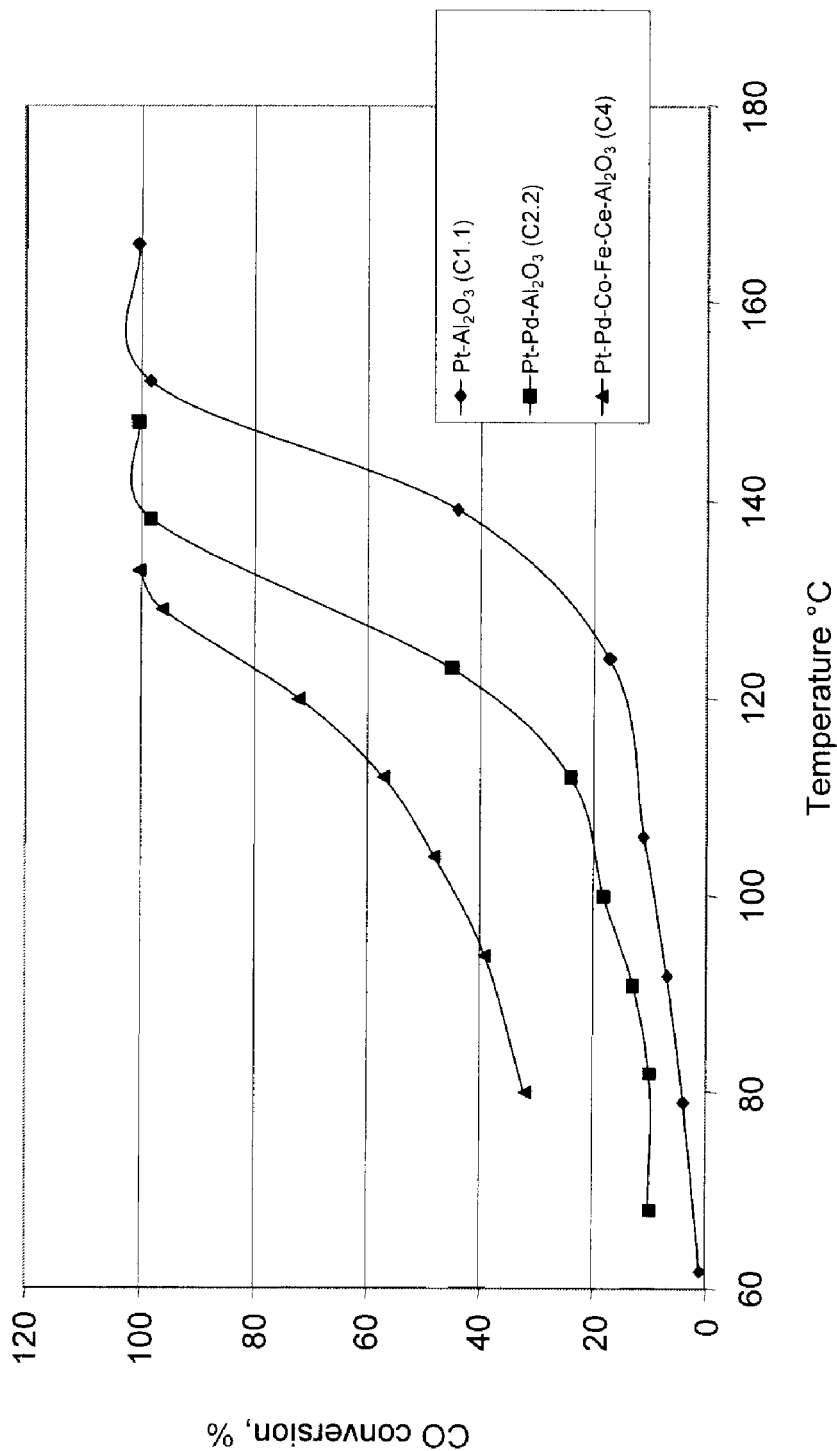
FIG. 4 shows the activity in CO oxidation of the (C4) catalyst in comparison to the reference (C2) catalyst and the standard Pt (C1) catalyst in CO oxidation after thermal aging.

FIG. 4 shows the activity of the (C4) catalyst in comparison to the catalyst (C2.1) and the standard Pt/alumina catalyst (C1.1) in CO oxidation after more severe thermal aging at 650° C. for one hour. Space velocity (SV) was 200 000 h−1 and the reaction mixture as mentioned before.

As an example for the conversion of unburned hydrocarbon, FIG. 5 shows the propane ($C_3H_6$) oxidation activity of different catalysts after aging those catalysts at 550° C. for three hours in the above mentioned reaction mixture using a SV=200 000 h−1.

As one can see in FIG. 5, the addition of cobalt oxide to Pt—Pd/alumina catalyst increased the activity in propane oxidation, but iron oxide had the opposite effect. The (C4) catalyst significantly higher activity than either the standard or the (C2) catalysts in propane oxidation.

FIG. 6 shows the NO conversion to $NO_2$ of the catalysts (C4) in comparison to the standard (C1) catalyst, the reference (C2) catalyst and comparative (C3) catalysts using the above defined reaction mixture and fresh catalysts. Space velocity (SV) was 200 000 h−1. After exposing the samples to the reaction mixture for one hour, the temperature was increased with temperature ramp of 5° C. per minute.

Figure 7:
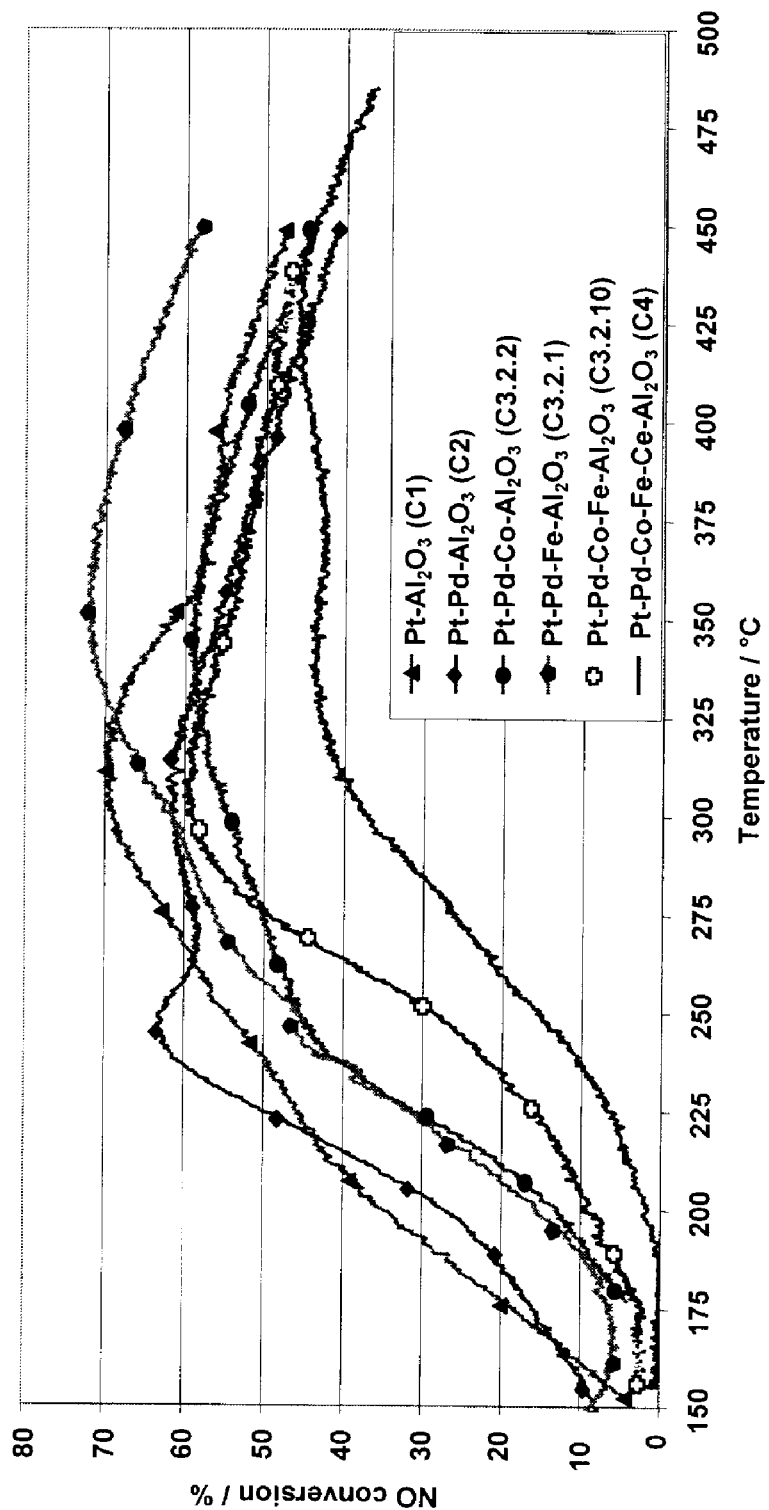
FIG. 7 shows the NO conversion to NO2 on (C4) catalyst in comparison to the standard (C1) catalyst, the reference (C2) catalyst and comparative (C3) catalysts after aging.

FIG. 7 shows the NO conversion to $NO_2$ of said tested catalysts after aging the catalysts at 650° C. for one hour. Boundary conditions are the same as described for FIG. 6.

As can be seen, the reference Pt—Pd/alumina-(C2) catalyst had not only comparable, but even high $NO_2$ concentrations regarding standard Pt/alumina-catalysts (C1). Noticeable $NO_2$ emissions are found at and above 150° C. due to the beginning of NO oxidation to $NO_2$.

Addition of Fe or Co or Fe—Co together (C3) decreased $NO_2$ formation, but for the Pt—Pd—Co—Fe—Ce/alumina-(C4) catalyst $NO_2$ emissions are the lowest for all temperature ranges. There were no $NO_2$ emissions at all up to 225° C., while standard and reference catalysts already had reached 30-50% conversion of NO to $NO_2$. Maximal conversion of NO to $NO_2$ did not exceed 40% whereas it was high up to 60-70% for standard and reference catalysts. Generally, NO oxidation to $NO_2$ is strongly suppressed by the (C4) catalyst up to 300° C.

$NO_2$ formed at 300-400° C. can be used for soot oxidation and will be converted back to NO. $NO_2$ formed at lower temperatures is not used for soot oxidation. Catalyst (C4) can produce enough soot oxidation to make it a useful catalyst notwithstanding any excess $NO_2$ production. It is important to note that the standard and reference catalysts increased their activity in $NO_2$ formation after aging at 650° C. in reaction mixture, as can be seen in FIG. 7. The (C4) catalyst showed only a slight increase in $NO_2$ formation.

The (C4) catalyst and the reference (C2) catalyst were also additionally tested under different conditions using practically the same reaction mixture. Namely, NO oxidation activity at different temperatures was tested, waiting at every temperature until the stationary concentrations of component are reached. This avoids adsorption-desorption problems and also measures passive deNOx activity (NOx reduction under action of reductants (CO and hydrocarbon) from reaction mixture, reaction mixture composition as before). The results are presented in FIG. 8.

The data presented in FIG. 8 confirms that the catalyst is much less active in NO oxidation and the data are similar to those shown in FIG. 6 and FIG. 7. The (C4) catalyst is also less active than the reference (C2) catalyst in the deNOx process with CO and hydrocarbon as a reductant in reaction mixture as expected, because deNOx (SCR—selective catalytic reduction) typically occurs via intermediate $NO_2$ formation, which is suppressed on the catalyst.

From these data one can also conclude that low $NO_2$ emissions from the (C4) catalyst are basically due to low NO oxidation activity but not due to deNOx (SCR) process.

Figure 9:
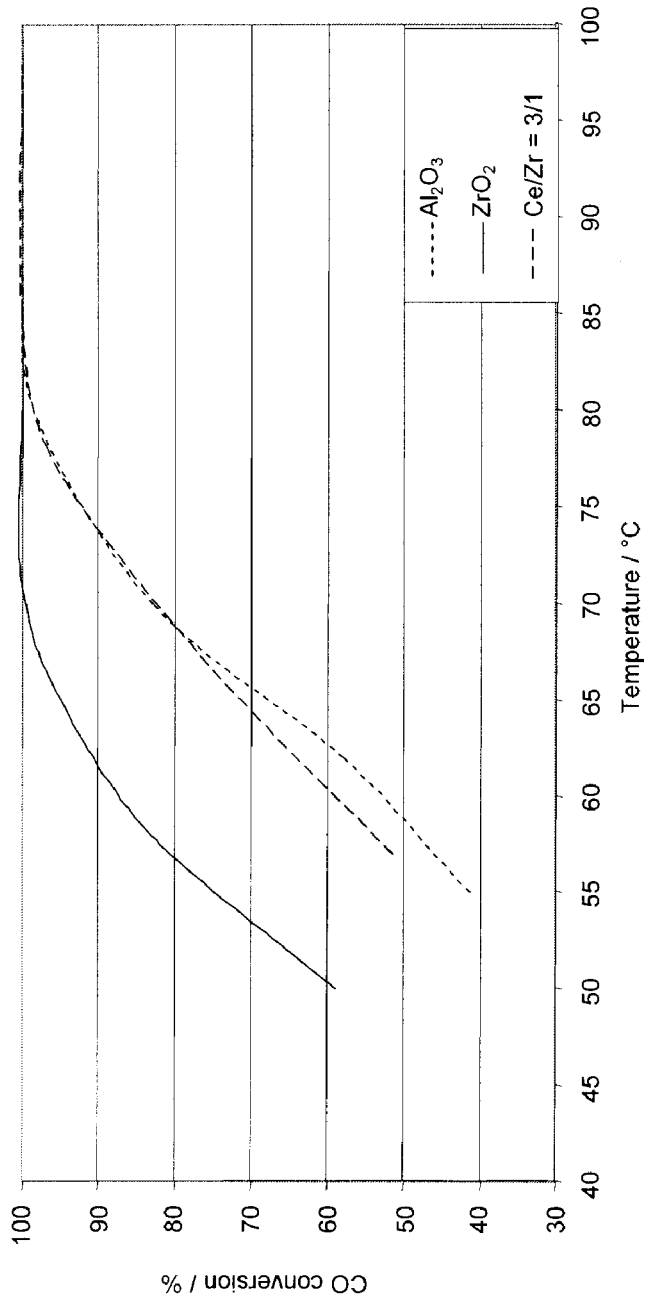
FIG. 9 shows the CO oxidation catalytic activity of (C4) catalyst supported on different oxides.

FIG. 9 represents the catalytic activity in CO oxidation of the (C4) catalyst supported on different substrates after aging at 550° C. for three hours in the above defined reaction mixture. Space velocity (SV) was 200 000 $h^{-1}$.

Figure 10:
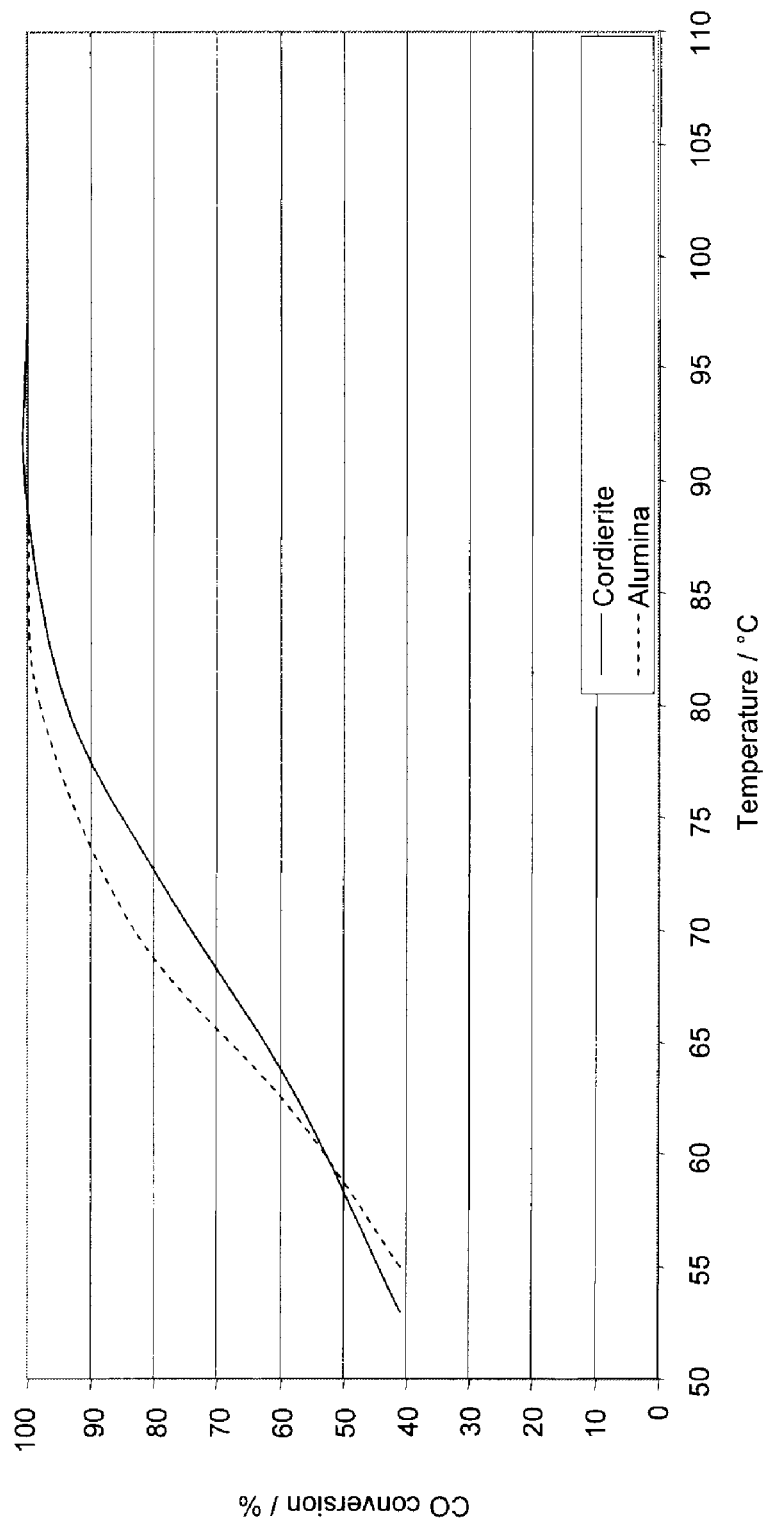
FIG. 10 shows the CO oxidation catalytic activity of (C4) catalyst supported on pure alumina and alumina-coated cordierite.

FIG. 10 shows the catalytic activity in CO oxidation of the (C4) catalyst supported on pure alumina and alumina-coated cordierite. Space velocity (SV) was 200 000 h-1 using the reaction mixture as before. Aluminum oxide (alumina) was used as a support in the examples listed in FIGS. 1-8. The (C4) catalyst may also be successfully employed on other supports. As shown in FIG. 9, the activity using zirconium is even higher than alumina and is practically the same on mixed cerium-zirconium oxide, typical oxygen storage material for three-way catalysts.

The Pt—Pd—Co—Fe—Ce/(C4) catalyst may be applied on alumina-washcoated cordierite, another oxidation catalyst substrate. As can be seen in FIG. 10, the catalyst shows very close, just slightly lower, activity for the same alumina loading for pure alumina and alumina-coated cordierite. This lower activity is likely due to the lower surface area of alumina in washcoat for cordierite.

The invention claimed is:

1. A catalyst having a substrate and a coating covering said substrate, wherein said coating comprises:
   platinum (Pt) and palladium (Pd); and
   active oxide components of cobalt (Co), iron (Fe) and cerium (Ce), wherein the amount of cerium (Ce) is between 2 weight percent (wt %) and 6.5 weight percent (wt %) of the total weight of the coating.

2. The catalyst according to claim 1, wherein the amount of Pt and Pd is less than 10 wt % of the total weight of the coating.

3. The catalyst according to claim 2, wherein the amount of Pt and Pd is less than 5 wt % of the total weight of the coating.

4. The catalyst according to claim 1, wherein the molar ratio of Pt and Pd is 1:1.

5. The catalyst according to claim 1, wherein the amount of cobalt (Co) is between 1 wt % and 3 wt % of the total weight of the coating.

6. The catalyst according to claim 5, wherein the amount of cobalt (Co) is between 1.5 wt % and 2.5 wt % of the total weight of the coating.

7. The catalyst according to claim 1, wherein the amount of iron (Fe) is between 1 wt % and 12 wt % of the total weight of the coating.

8. The catalyst according to claim 7, wherein the amount of iron (Fe) is between 4 wt % and 9 wt % of the total weight of the coating.

9. The catalyst according to claim 1, wherein the amount of cerium (Ce) is between 3.5 wt % and 5 wt % of the total weight of the coating.

10. The catalyst according to claim 1, wherein said substrate is cordierite.

11. A method of producing an oxidation catalyst comprising the steps of:
   preparing a solution containing (i) platinum (Pt) tetra ammine salts, (ii) palladium (Pd) tetra ammine nitrate, (iii) nitrates of iron (Fe), cerium (Ce) and cobalt (Co), (iv) tartaric acid;
   impregnating a substrate with said solution to form a coating on the substrate, wherein the amount of cerium (Ce) is between 2 weight percent (wt %) and 6.5 weight percent (wt %) of the total weight of the coating;
   drying the impregnated support; and
   calcinating the impregnated support.

12. The method of claim 11, wherein the tartaric acid (iv) is of an amount exceeding the amounts for the components (i)-(iii) by a factor of 1.2 to 20.

13. The catalyst according to claim 1, wherein said substrate is one or both of zirconium and cerium-zirconium.

14. The catalyst according to claim 13, wherein said substrate is zirconium and cerium-zirconium present in a molar ratio of 3 to 1.

15. A catalyst having a substrate and a coating covering said substrate, wherein said coating comprises:
   platinum (Pt) and palladium (Pd); and
   active oxide components of cobalt (Co), iron (Fe) and cerium (Ce),
   wherein the amount of Pt and Pd is less than 5 wt % of the total coating and wherein the amount of cobalt (Co) is between 1.5 wt % and 2.5 wt % of the total coating, wherein the amount of cerium (Ce) is between 2 wt % and 6.5 wt % of the total weight of the coating.

16. The catalyst according to claim 15 wherein the amount of iron (Fe) is between 4 wt % and 9 wt % of the total weight of the coating.

17. The catalyst according to claim 16, wherein the amount of cerium (Ce) is between 3.5 wt % and 5 wt % of the total weight of the coating.

18. The method according to claim 11, wherein in the preparing step, the platinum tetra amine salts are drop-wise added to the tartaric acid to reduce platinum-containing deposit.

\* \* \* \* \*